US005357406A

United States Patent [19]

Saget et al.

[11] Patent Number: 5,357,406

[45] Date of Patent: Oct. 18, 1994

[54] MOTOR VEHICLE HEADLAMP FITTED WITH IMPROVED VENTILATION MEANS

[75] Inventors: Marc Saget, Ezanville; Ghislaine Pinson, Villeneuve la Garenne, both of France

[73] Assignee: Valeo Vision, Bobigny, France

[21] Appl. No.: 993,314

[22] Filed: Dec. 18, 1992

[30] Foreign Application Priority Data

Dec. 20, 1991 [FR] France ............................ 91 15912

[51] Int. Cl.⁵ ............................................ B60Q 1/06

[52] U.S. Cl. ..................................... 362/61; 362/80; 362/294

[58] Field of Search ...................... 362/61, 66, 68, 80, 362/419, 373, 294

[56] References Cited

U.S. PATENT DOCUMENTS

| | | | |
|---|---|---|---|
| 4,405,974 | 9/1983 | Quiogue | 362/294 |
| 5,010,453 | 4/1991 | Ketterman | 362/294 |
| 5,113,320 | 5/1992 | Haydu | 362/61 |

FOREIGN PATENT DOCUMENTS

| | | |
|---|---|---|
| 286540 | 10/1988 | European Pat. Off. . |
| 2610932 | 9/1977 | Fed. Rep. of Germany . |
| 2089957 | 6/1982 | United Kingdom . |

*Primary Examiner*—James C. Yeung

[57] ABSTRACT

A motor vehicle headlamp of the closed type includes ventilation means for ventilating its inside volume, said means comprising at least one air inlet and one air outlet. According to the invention, the air outlet opens out into a hollow column that is disposed so as to have a substantial inclination relative to the horizontal. The top end of the column is closed. Along one of the outside walls of the column there is an elongate opening which opens out to the outside and which has a top end terminating at a certain distance from the closed top end of the column. Finally, the air outlet opens out into the column at a certain distance above the top end of the opening. This provides an air outlet associated with a device that ensures that extraction takes place adequately even when the vehicle is stationary, while nevertheless minimizing the risk of water penetrating into the headlamp, e.g. due to a cleaning jet.

12 Claims, 1 Drawing Sheet

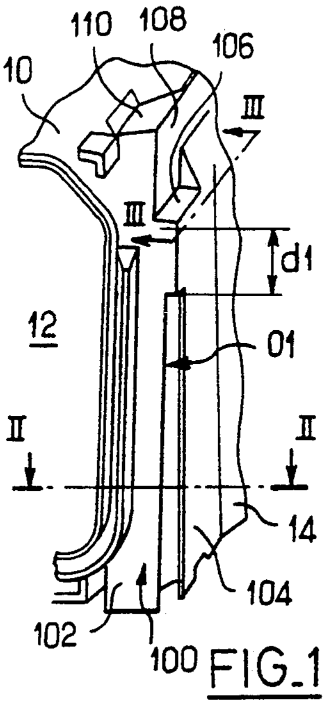
FIG_1
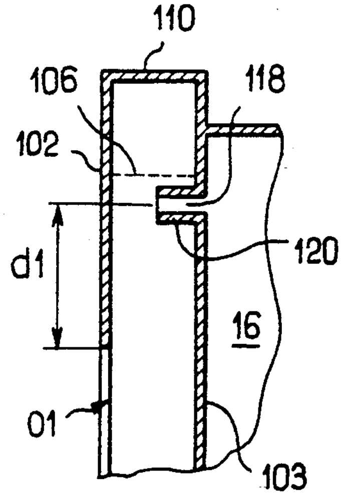
FIG_3
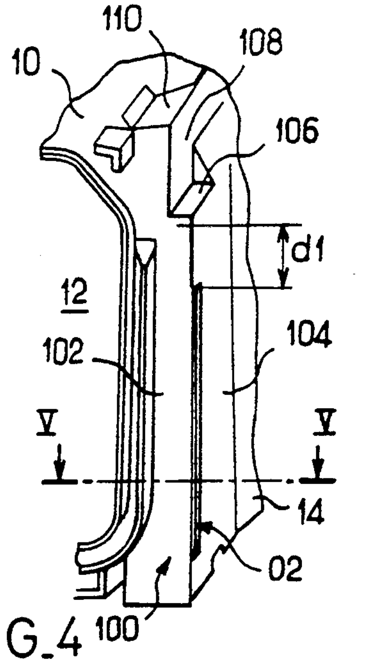
FIG_4
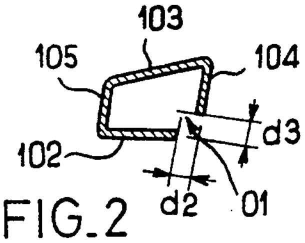
FIG_2
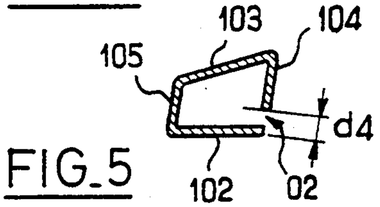
FIG_5
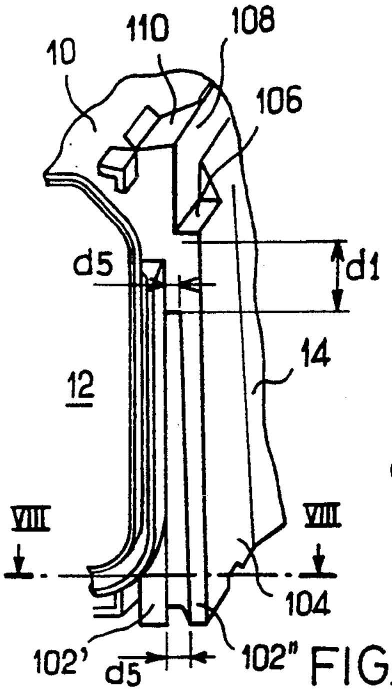
FIG_6
FIG_8
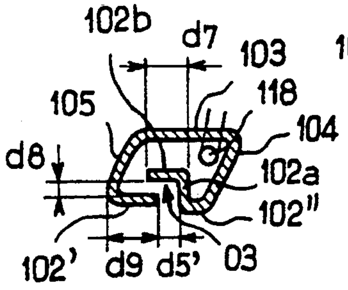
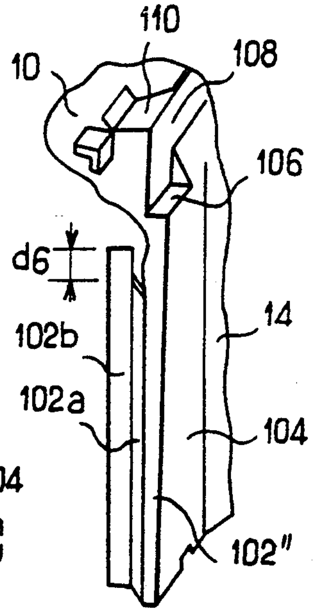
FIG_7

MOTOR VEHICLE HEADLAMP FITTED WITH IMPROVED VENTILATION MEANS

The present invention relates in general to the ventilation of motor vehicle headlamps.

BACKGROUND OF THE INVENTION

The prior art includes a certain number of devices for renewing the air in the space inside a headlamp, in particular so as to avoid phenomena of water accumulating or condensing on the cold portions thereof.

In particular, a certain number of solutions are known that make use of a chimney having an open top end and communicating at a level lower than said top end with the space inside the headlamp. By placing the open end of the chimney in the air stream of the moving vehicle, a suction system is established in the chimney which tends to evacuate the moisture-laden air contained in the headlamp. Fresh air is thus spontaneously drawn into the headlamp through another opening, e.g. situated in the bottom region of the headlamp.

This kind of known solution nevertheless presents a certain number of drawbacks. Firstly, because the ventilation chimney has a relatively exposed open top end inside the engine compartment of the vehicle, there is an increase in the risk that water may penetrate accidentally into the space inside the headlamp, in particular when washing the engine compartment with a high pressure water jet, which practice is becoming more and more common.

In addition, the above known ventilation device is disadvantageous in that no air flows over the open top end of the chimney when the vehicle is stationary, so ventilation is no longer provided.

An object of the present invention is to mitigate these drawbacks and to provide a ventilation device in which the risks of water penetrating accidentally into the space inside the headlamp are minimized, and in which ventilation is suitably provided even when the vehicle is stationary.

SUMMARY OF THE INVENTION

To this end, the present invention provides a motor vehicle headlamp of the closed type including ventilation means for ventilating its inside space, which means comprise at least one air inlet and at least one air outlet, wherein:

the air outlet opens out into a hollow column;

the column is closed at its top end; and an elongate opening opening to the outside is provided along an outside wall of the column.

Preferably, the column slopes substantially relative to the horizontal, and even more preferably it is disposed vertically or practically vertically.

In an advantageous embodiment, said elongate opening terminates at a top end that is at a distance from the closed top end of the column, and in that the air outlet opens out into the column at a certain distance above the top end of the opening.

Particularly advantageously, a baffle may be associated with the opening, in particular to prevent a washing jet being able to strike the inside walls of the column directly. Under such circumstances, the above-specified feature becomes optional and the height of the air outlet in the column may be almost arbitrary.

BRIEF DESCRIPTION OF THE DRAWING

Preferred embodiments of the invention are described by way of example with reference to the accompanying drawing, in which:

FIG. 1 is a fragmentary perspective view of a headlamp housing fitted with an air extractor device constituting a first embodiment of the invention;

FIG. 2 is a section view on line II—II of FIG. 1;

FIG. 3 is a section view on III—III of FIG. 1, on a larger scale;

FIG. 4 is a fragmentary perspective view of a headlamp housing fitted with an air extractor device constituting a second embodiment of the invention;

FIG. 5 is a section view on line V—V of FIG. 4;

FIG. 6 is a fragmentary perspective view of a headlamp housing fitted with an air extractor device constituting a third embodiment of the invention;

FIG. 7 is a perspective view similar to FIG. 6, but with some portions partially cutaway; and FIG. 8 is a section view on line VIII–VIII of FIG. 7.

DETAILED DESCRIPTION

As an initial point, it may be observed that elements or portions that are identical or similar from one figure to another are designated therein by the same reference symbols.

With reference initially to FIGS. 1 to 3, there can be seen a portion of the rear region of a headlamp housing 10 which includes an opening 12 that is normally closed in sealed manner by a cap (not shown) and which provides access to the lamp for the purpose of replacing it.

The housing also includes an air inlet opening in conventional manner (not shown), preferably located in the bottom region thereof.

According to the present invention, an extractor device enabling a flow of air to be established through the housing between said air inlet and said device comprises a hollow column 100 situated in line with one of the side walls 14 of the housing e.g. to one side of the rear opening 12. This column preferably extends over a height corresponding at least approximately to the height of the housing 10.

The column is closed at its top end and is preferably open at its bottom end. It is delimited by four walls, comprising a rear wall 102, a front wall 103, an outer side wall 104, and an inner side wall 105. The walls 103 and 105 separate the space inside the housing (referenced 16 in FIG. 3) from the space in the bottom of the column.

The top region of the column has an inwards step 106 and it extends upwards beyond the step via a portion of smaller section. Reference 108 designates the setback side wall of the column above the step 106. The wall completely closing the top end of the column is referenced 110.

The space inside the housing communicates with the column via a passage 118 defined by a duct 120 (e.g. a cylindrical duct) which projects into the column 100, extending from the front towards the rear over about one-half the width of the column (FIG. 3). The free end of the duct 120 is preferably straight. In this example, the duct 120 is situated immediately beneath the step 106 and close to the side wall 104, i.e. in a corner region of the column 100, and in particular in the top portion thereof.

The column communicates with the outside via an elongate opening extending generally vertically and formed in at least one of the outside walls 102 and 104 of the column.

In the example shown in FIGS. 1 to 3, this opening (which is referenced 01) is situated on the comer joining the walls 102 and 104. This opening extends over the major portion of the height of the column, but nevertheless terminates a certain vertical distance d1 below the duct 120. In its bottom region, the opening 01 preferably extends to the bottom of the column 100.

The distance dl is preferably about 20 mm.

In addition, with reference to FIG. 2, it can be seen that the opening 01 is defined by the walls 102 and 104 being set back over horizontal distances d2 and d3 that are similar and preferably both equal to about 4 mm.

Because of the present invention, it is ensured that air is extracted effectively by means of the passage 118, the space inside the column 100, and the opening 01. In particular, by disposing the opening 01 vertically up the column, it is possible to give the opening a section that is large enough to ensure that such ventilation takes place without it being necessary to take advantage of the air stream created by the vehicle moving, and yet there is no risk of water or dust penetrating into the space inside the headlamp. This is achieved by disposing the passage 118 well above the opening 01, together with the special orientation of said opening and the special orientation and position of the duct 120.

FIGS. 4 and 5 show a second embodiment of the extractor device. Compared with FIGS. 1 to 3, the disposition of the vertical opening in the column is different. The opening is referenced 02 and it extends entirely in the outer side wall 104. More precisely, the opening 02 is made by interrupting said wall 104 at a certain horizontal distance D4 from the corner formed with the rear wall 102. This distance D4 is preferably close to 4 mm.

It may be observed at this point that the vertical extent of the top portion of the opening 12 is advantageously the same as that of the opening 01, and the distance dl is preferably about 20 mm. In this case, the bottom portion of the opening 02 is interrupted at a certain distance from the bottom of the column. This interruption could also be used in all of the other embodiments.

FIGS. 6 to 8 show a third embodiment of the invention. Here again, it is only with respect to the vertical opening in the column that there are any differences over the preceding embodiments.

In this embodiment, the vertical opening in the column 100, now referenced 03, is formed in the rear wall of the column and is associated with a baffle.

More precisely, the opening 03 extends approximately to the middle of said rear wall which is defined by two half-walls 102' and 102" situated on either side of said opening. A reentrant partition **102*a* extends inwards from the edge of the wall portion 102" adjacent to the opening, preferably perpendicularly to said wall portion. Another partition 102*b* which substantially overlies the opening 03 extends to the left in FIGS. 6 to 8 from the inside vertical edge of said reentrant partition 102*a*. In FIG. 7, it can be seen that said partition 102*b* extends upwards beyond the top end of the opening 03** through a vertical distance referenced d6.

A sinuous path having a bend of about 90° is thus defined adjacent to the opening 03, thereby preventing the space inside the column 100 being exposed to direct water spray, e.g. when washing the engine compartment with a high pressure Jet. This further reduces the risk of water penetrating into the space inside the headlamp through the passage 118. By extending the partition **102*b* upwards above the top end of the opening 03, this risk is further reduced, because the extension constitutes a direct screen in the vicinity of the free end of the duct 120** providing communication with the space inside the housing.

It may also be observed that when the baffle such as that described above is provided, or when an equivalent baffle is provided in association with the opening 01 or 02 in one of the preceding embodiments, there is no longer any need for the air outlet (passage 118) to be situated at a certain distance above the top end of the column, so said air outlet can then be placed at practically any height.

It may be observed that the opening 03 flares progressively downwards, going from a width d5 to a width d5'. d5 is preferably chosen to be about 5 mm while d5' is about 6 mm. As shown in FIG. 8, the width of wall portion 102" is designated d9, and this distance may be about 12 mm, for example. The depth between the partition **102*b* and wall portion 102' is designated d8, and a preferred value is about 3 mm. Finally, d7 designates the width of said partition 102*b***, which is preferably equal to about 10 mm.

Naturally, the present invention is not limited to the embodiments described above and shown in the drawing, and the person skilled in the art will be able to apply variations or modifications thereto coming within its spirit. In particular, although the above description relates to a column and an associated opening that extends generally vertically, it will be understood that they could extend obliquely.

We claim:

1. A motor vehicle headlamp having a housing defining a closed inside space, said headlamp including ventilation means comprising air inlet means and air outlet means for ventilating said inside space, wherein said air outlet means comprises:

a hollow column formed on said housing and extending essentially vertically across a substantial part of the height of said housing, said column being closed at an upper end thereof, an air outlet duct extending essentially horizontally between said inside space of said housing and the internal space of said hollow column in an upper region thereof, and an elongate opening provided along an outside wall of said column remote frown said housing and extending essentially vertically, said elongate opening providing air communication between said internal space of the hollow column and the outside.

2. A motor vehicle headlamp according to claim 1, wherein an upper end of said elongate opening is located at a lower vertical level than said air outlet duct.

3. A motor vehicle headlamp according to claim 2 wherein said air outlet duct projects inside said internal space of the hollow column.

4. A motor vehicle headlamp according to claim 1, wherein said air outlet duct opens out into an angle portion of the internal space of said column.

5. A motor vehicle headlamp according to claim 1, wherein an outer side wall of said hollow column is located in the same plane as a lateral wall of said housing, and said elongate opening is provided in said outer side wall.

6. A motor vehicle headlamp according to claim 5, wherein said elongated opening extends adjacent to an edge between said outer side wall and an outer rear wall of said column.

7. A motor vehicle according to claim 1, wherein said elongate opening extends in a middle region of an outer rear wall of said hollow column.

8. A motor vehicle headlight according to claim 1, wherein said air outlet means further comprises a baffle located opposite said elongate opening.

9. A motor vehicle headlamp according to claim 1, wherein the vertical distance between said air outlet duct and the upper end of said elongate opening is about 20 min.

10. A motor vehicle headlamp according to claim 1, wherein a lower end of said elongated opening is located at a vertical level above a lower open end of said hollow column.

11. A motor vehicle headlamp having a housing defining a closed inside space, said headlamp including ventilation means comprising air inlet means and air outlet means for ventilating said inside space, wherein said air outlet means comprises:

a hollow column formed on said housing and extending essentially vertically, said column being closed at an upper end thereof, an air outlet passage extending between said inside space of said housing and the internal space of said hollow column in an upper region thereof, and an elongate opening provided along an outside wall of said column, said elongate opening providing air communication between said internal space of the hollow column and the outside, wherein said column is delimited in part by two outer walls which define an angle therebetween, and said elongate opening is provided in the region of said angle and overlies said two outer walls.

12. A motor vehicle headlamp having a housing defining a closed inside space, said headlamp including ventilation means comprising air inlet means and air outlet means for ventilating said inside space, wherein said air outlet means comprises:

a hollow column formed on said housing and extending essentially vertically, said column being closed at an upper end thereof, an air outlet passage extending between said inside space of said housing and the internal space of said hollow column in an upper region thereof, and an elongate opening provided along an outside wall of said column, said elongate opening providing air communication between said internal space of the hollow column and the outside, a baffle extending opposite said elongate opening, said baffle including a partition overlying said elongate opening and extending upwards beyond the upper end of said elongate opening.

* * * * *